United States Patent
Kuhn et al.

(10) Patent No.: US 11,731,310 B2
(45) Date of Patent: Aug. 22, 2023

(54) DEVICE INCLUDING AN AGITATOR SHAFT AND A CONVEYOR FOR APPLYING A BUILDING MATERIAL

(71) Applicant: SIKA TECHNOLOGY AG, Baar (CH)

(72) Inventors: Patrik Kuhn, Zürich (CH); Raphael Bourquin, Neerach (CH); Armin Brühwiler, Bütschwil (CH); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 626 days.

(21) Appl. No.: 16/634,395

(22) PCT Filed: Aug. 9, 2018

(86) PCT No.: PCT/EP2018/071638
§ 371 (c)(1),
(2) Date: Jan. 27, 2020

(87) PCT Pub. No.: WO2019/030329
PCT Pub. Date: Feb. 14, 2019

(65) Prior Publication Data
US 2021/0114252 A1    Apr. 22, 2021

(30) Foreign Application Priority Data
Aug. 9, 2017   (EP) .................................. 17185652

(51) Int. Cl.
*B28B 1/00* (2006.01)
*B28C 5/40* (2006.01)
(Continued)

(52) U.S. Cl.
CPC ................ *B28B 1/001* (2013.01); *B28C 5/40* (2013.01); *B01F 27/1121* (2022.01);
(Continued)

(58) Field of Classification Search
CPC ........... B28B 1/001; B28C 5/40; B28C 5/026; B28C 5/0893; B28C 5/1292; B28C 5/148;
(Continued)

(56) References Cited

U.S. PATENT DOCUMENTS 1,732,281 A * 10/1929 Robinson .................. B28C 5/34
366/97
1,753,716 A *  4/1930 Owen .................... B28C 5/1292
366/38

(Continued)

FOREIGN PATENT DOCUMENTS

CN         201780061 U     3/2011
CN         205086160 U     3/2016
(Continued)

OTHER PUBLICATIONS

Feb. 11, 2020 International Preliminary Report on Patentability issued in International Patent Application No. PCT/EP2018/071638.
(Continued)

*Primary Examiner* — Charles Cooley
(74) *Attorney, Agent, or Firm* — Oliff PLC (57) ABSTRACT

A system for applying a building material, including: a movement device for modifying a site of application in a space; a first component of the building material; a second component of the building material; and a mixer for mixing the first component and the second component, the mixer including a drive and a mixing chamber provided with a stirrer shaft and a conveyor device, the conveyor device being designed as a screw conveyor with windings, and the mixer being adapted to the building material.

13 Claims, 5 Drawing Sheets

(51) Int. Cl.
    *B33Y 10/00*     (2015.01)
    *B33Y 30/00*     (2015.01)
    *B28C 5/12*     (2006.01)
    *B01F 27/1121*     (2022.01)
    *B28C 5/08*     (2006.01)
    *B28C 5/14*     (2006.01)
    *B28C 5/02*     (2006.01)

(52) U.S. Cl.
    CPC ............ *B28C 5/026* (2013.01); *B28C 5/0893* (2013.01); *B28C 5/1292* (2013.01); *B28C 5/148* (2013.01); *B33Y 10/00* (2014.12); *B33Y 30/00* (2014.12)

(58) Field of Classification Search
    CPC ............... B01F 27/1121; B01F 27/071; B01F 27/1921; B01F 27/2123; B01F 33/5013; B33Y 10/00; B33Y 30/00
    USPC ........................................................ 366/1–6
    See application file for complete search history.

(56) References Cited

U.S. PATENT DOCUMENTS

| | | | | |
|---|---|---|---|---|
| 3,006,615 A * | 10/1961 | Mason, Jr. | ............ | B28C 5/1276 137/99 |
| 3,346,240 A * | 10/1967 | Lavelle | .................. | A21C 1/065 366/168.1 |
| 3,430,929 A * | 3/1969 | Kawecki | ............... | B22C 5/0413 366/8 |
| 3,606,277 A * | 9/1971 | Kader | ...................... | F04D 3/02 366/50 |
| 3,916,825 A * | 11/1975 | Schnitzler | ............ | B27N 1/0245 366/172.1 |
| 4,039,169 A * | 8/1977 | Bartholomew | ....... | B01F 27/701 366/64 |
| 4,117,547 A * | 9/1978 | Mathis | ................ | B01F 27/2123 366/29 |
| 4,175,867 A * | 11/1979 | Piazza | ...................... | B28C 5/02 366/337 |
| 4,322,168 A * | 3/1982 | Hartung | ................. | B22C 5/0413 366/15 |
| 4,492,478 A * | 1/1985 | Ito | ........................ | B28B 19/0023 366/181.4 |
| 4,499,561 A * | 2/1985 | Mason | ................... | B01F 35/711 366/186 |
| 4,778,276 A * | 10/1988 | Meyer | .................... | B01F 27/192 366/303 |
| 4,844,340 A * | 7/1989 | Miyata | ..................... | B05B 7/149 239/311 |
| 5,352,035 A * | 10/1994 | Macaulay | ............. | B01F 27/726 366/186 |
| 5,656,230 A | 8/1997 | Khoshevis | | |
| 6,454,972 B1 | 9/2002 | Morisette et al. | | |
| 11,331,827 B2 * | 5/2022 | Liard | ...................... | B33Y 40/10 |
| 11,623,191 B2 * | 4/2023 | Kuhn | ....................... | B28C 5/148 264/308 |
| 2007/0217281 A1* | 9/2007 | McAnally | ............. | B28C 5/4268 366/53 |
| 2014/0269146 A1* | 9/2014 | Harris | ...................... | B01F 29/63 366/44 |
| 2019/0047176 A1* | 2/2019 | Kuhn | ....................... | B28C 5/143 |
| 2020/0139579 A1* | 5/2020 | Liard | ....................... | C04B 28/04 |
| 2020/0148594 A1* | 5/2020 | Liard | .................. | C04B 40/0046 |
| 2020/0156284 A1* | 5/2020 | Kuhn | ....................... | B33Y 30/00 |

FOREIGN PATENT DOCUMENTS

| | | | |
|---|---|---|---|
| CN | 205517447 U | 8/2016 | |
| DE | 102007004768 A1 * | 8/2008 | ........ B01F 15/00253 |
| EP | 1023978 A1 * | 8/2000 | .......... B01F 15/0201 |
| JP | H03-186334 A | 8/1991 | |
| WO | 2013/064826 A1 | 5/2013 | |
| WO | WO-2019030328 A1 * | 2/2019 | .......... B01F 13/0032 |
| WO | WO-2019030329 A1 * | 2/2019 | .......... B01F 13/0032 |

OTHER PUBLICATIONS

Oct. 11, 2018 Search Report issued in International Patent Application No. PCT/EP2018/071638.

\* cited by examiner

DEVICE INCLUDING AN AGITATOR SHAFT AND A CONVEYOR FOR APPLYING A BUILDING MATERIAL

TECHNICAL FIELD

The present invention concerns a device for applying a building material, and a method for producing a structure from the building material.

BACKGROUND

A known system for applying building materials is described for example in WO 2013/064826 A1. A pourable building material is applied via a crane-like arm in order to produce structures from the building material. The building material, in this case a cement-like material, is stored in a container and applied from there via a nozzle. The container itself is filled by a pump via a hose. The disadvantage of such a system is that there is not a constant flow of building material because the container must be repeatedly refilled.

SUMMARY

It is an object of the present invention to provide a device for applying a building material, and a method for producing a structure from a building material, which allow the building material to be applied continuously. Also, the system can be adapted to different building materials in a simple and economic fashion.

BRIEF DESCRIPTION OF THE DRAWINGS

Details and advantages of the invention are described in more detail below with reference to exemplary embodiments and diagrammatic drawings. The drawings show.

DETAILED DESCRIPTION

This object is firstly achieved by a device for applying a building material, wherein the device comprises: a movement device for changing an application site in a space; a first component of the building material; a second component of the building material; and a mixer for mixing the first component and the second component, wherein the mixer comprises a drive and a mixing chamber provided with an agitator shaft and a conveyor device, wherein the conveyor device is designed as a screw conveyor with windings.

In an exemplary embodiment, the building material is a concrete, wherein the first component of the building material comprises a pumpable concrete, and wherein the second component of the building material is a concrete additive, in particular an accelerator.

In an alternative embodiment, the building material is a multicomponent compound on a plastic basis. Here, the first component is typically a reactive polymer or monomer, and the second component is a hardener or accelerator for the cross-linking or hardening of this polymer or monomer. Such compounds are for example epoxy resins, polyurethanes, silane functional polymers, silicones, acrylates and similar.

In a first embodiment, the device is adapted for building materials which contain fibers. Here, a distance between adjacent windings of the screw conveyor is at least 40% of a length of the fibers, and/or a distance between adjacent agitator elements of the agitator shaft is at least 40% of a length of the fibers.

A first advantage of building materials with fibers is that the fibers allow the production of structures with higher bending strength. Structures made of building materials with fibers do not break as quickly as building materials without fibers, and also when pieces of the building material have already broken, the fibers hold these pieces together so that the structure itself is still substantially retained even on breakage.

Depending on the fibers used, a further advantage of building materials with fibers may be that the fibers are able to connect together adjacent layers laid over each other by the device. This increases a stability of the structure produced from the building material.

In order to prevent a blockade of the system, the conveyor device is now adapted to the length of the fibers. It has been found that adjacent windings of the screw conveyor should cover at least 40% of the length of the fibers in order to effectively prevent blockades from the clogging of fibers in the conveyor device. A similar effect was observed with the agitator elements of the agitator shaft. Here again, it is advantageous to space adjacent agitator elements such that a distance between adjacent agitator elements is at least 40% of the length of the fibers. This measure can guarantee fault-free use of the device proposed here for application of a building material with fibers.

It has been observed that agitator devices or conveyor devices in which fibers can become seized have a tendency towards blockades of the building materials. Therefore it is a core concept of the present invention that, when using building materials with fibers, such conveyor devices and agitator devices are configured such that the fibers cannot become wedged therein. This is achieved in particular by corresponding spacing of adjacent windings of the screw conveyor or by a corresponding spacing of adjacent agitator elements of the agitator device.

In an exemplary refinement, a distance between adjacent windings of the screw conveyor is at least 60% of a length of the fibers, and/or a distance between adjacent agitator elements of the agitator shaft is at least 60% of a length of the fibers.

In a further exemplary refinement, a distance between adjacent windings of the screw conveyor is at least 80% of a length of the fibers, and/or a distance between adjacent agitator elements of the agitator shaft is at least 80% of a length of the fibers.

In a further embodiment, the system is adapted to building materials which have no fibers. Here, distances between adjacent windings of the screw conveyor are smaller, the closer the windings are arranged to an outlet, and/or a distance between adjacent agitator elements of the agitator shaft is between 5 and 50 mm, preferably from 7 to 40 mm, particularly preferably from 10 to 13 mm.

It has been observed that, in a conveyor device in which the distances between the windings becomes smaller towards the outlet, a consistent and constant outflow of building material can be guaranteed, which is particularly suitable for production of structures of building material. By reducing the distances between the windings towards the outlet, the building material is conveyed through the conveyor device with a specific pressure. It has been found that with such a design of the conveyor device, a very constant outflow of building material can be achieved.

It has furthermore been observed that arranging the agitator elements at said distances leads to a homogenous building material mixture. It has also been observed that the provision of usually more agitator elements, in comparison with use for building materials with fibers, achieves a higher energy input from the mixer into the building material, which has an advantageous effect on the break-up of the components of the building material and on the reaction of the first and second components of the building material with each other. A high energy input from the mixer into the building material also has the advantage that the building material is brought to a higher temperature, which in turn leads to a faster hardening of the building material after it has emerged from the device.

It is a core concept of the present invention that, for use without fibers, the conveyor device and the agitator device can be optimized in that the building material is delivered from the device with a specific pressure, and/or that the components of the building material are mixed together with optimized energy input from the mixer. Since there are no fibers in this exemplary embodiment, the entire system is less susceptible to blockades.

In a further exemplary embodiment, the system is adapted to a diameter of the grains of an aggregate of the first component of the building material. It has been found that, in particular, a distance between the agitator elements of the agitator shaft and an inner wall of the mixing chamber can be optimized with regard to a diameter of the grains of the aggregate. A similar effect was observed for a distance between outer faces of the windings of the conveyor device and the inner wall of the mixing chamber. It has been found that these distances between the agitator elements of the agitator device or the outer surfaces of the windings of the conveyor device and the mixing chamber should be selected at least the same size as a diameter of the grains of the aggregate.

In a further embodiment, therefore, a distance between ends of agitator elements of the agitator shaft and/or outer surfaces of the windings of the conveyor device and an inner wall of the mixing chamber is at least as large as a diameter of the grains of the aggregate.

A core concept of the present invention with regard to adaptation of the device with respect to the size of the aggregate is that the distances between the rotating elements and the inner walls of the mixing chamber may be adapted to the size of the aggregate. In particular, it has been found that aggregates of the building material can become seized between the rotating elements and the drum of the mixing chamber. Such seizing firstly leads to higher wear on the corresponding elements and secondly can block the system. It is therefore advantageous to select said distances at least as large as the diameter of the aggregate of the building material.

The diameter of the grains of the aggregate, in the context of this invention, is a mean maximum diameter of the aggregate of the building material.

As a whole, the invention is based on the knowledge that the rotating constituents of the mixer or conveyor device of the device for applying the building material be optimized with respect to the composition of the building material. In particular, the distances between the windings of the conveyor device, the distances between the agitator elements of the agitator device, and the distances between rotating elements and the inner wall of the mixing chamber, may be adapted to the constituents of the building material. Such adaptation has the advantage that constant operation of the device may be guaranteed without blockades of the building material in the device, wherein simultaneously a mixing of the components and a delivery by the conveyor device may be optimized.

In an exemplary embodiment, a first winding of the screw conveyor has a smaller diameter than following windings.

The provision of such a smaller first winding of the screw conveyor offers the advantage that in this way, the building material can be better collected by the conveyor device, because it is easier for the building material to enter the conveyor device from outside into the region between the first and second winding.

In an exemplary embodiment, the first winding of the screw conveyor has an outer face which is chamfered by an angle α such that a first edge is lower than the second edge.

In particular, the first edge is spaced further from the second winding than the second edge.

In a preferred refinement, the angle α is between 10° and 50°, particularly preferably between 15° and 45°, particularly preferably between 20° and 40°.

The provision of such a chamfered outer face of the first winding has the advantage that the building material can be collected more gently by the conveyor device, which again leads to fewer blockades of the building material in the conveyor device.

In an exemplary embodiment, the agitator elements have external threads, and the agitator shaft has depressions with internal threads, so that the agitator elements can be inserted in and removed from the agitator shaft by rotation.

Such a mechanism for insertion or removal of the agitator elements in or from the agitator shaft has the advantage that the mixer can easily be adapted to the building material used. In particular, for building materials with fibers, fewer agitator elements are used than for building materials without fibers. Furthermore, such a mechanism allows the agitator elements to be replaced easily as wearing parts.

In an exemplary embodiment, the number of agitator elements for building materials with fibers, in comparison with that for building materials without fibers, amounts to between 30 and 70%, preferably between 35 and 65%, particularly preferably between 40 and 60% of the agitator elements.

In an exemplary refinement, the agitator elements are configured as pins.

It has been found that, using pins, the components of the building material can be mixed efficiently, and at the same time a clogging of the building material in the mixer can be prevented, in particular in the case of building materials with fibers.

In an exemplary embodiment, the building material contains fibers and distances between adjacent windings are substantially equal.

In an alternative embodiment, the building material contains fibers and distances between the windings of the conveyor device becomes smaller, the closer the windings are arranged to an outlet, wherein the smallest distance between adjacent windings is at least 40% of a length of the fibers.

In an exemplary embodiment, the building material contains fibers and the conveyor device has two to four windings.

In an exemplary embodiment, a cross-section of a delimiting surface of the conveyor device is formed so as to be substantially rectilinear or substantially S-shaped.

The shape of the cross-section of the delimiting surface may be used to influence a pressure with which the building material is conveyed out of the conveying device. As well as the cross-section of the delimiting surface, the spacing of the windings also plays a role here. Overall, the conveyor device may be optimized such that firstly a desired pressure can be built up, and secondly a blockade by the building material can be prevented, in particular in the case of building materials containing fibers.

In an exemplary embodiment, the building material contains fibers and the fibers have a length of 5 to 20 mm, preferably 7 to 70 mm, particularly preferably 10 to 15 mm; the fibers have a width of 5 to 2000 µm, preferably 20 to 1000 µm, particularly preferably 30 to 500 µm; and the fibers have a height of 5 to 200 µm, preferably 10 to 150 µm, particularly preferably 30 to 100 µm.

It has been found fibers dimensioned in this way are particularly suitable for increasing the bending strength of a structure made from the building material, and secondly can be guided through the mixer without blocking this.

In an exemplary embodiment, the building material contains fibers, and the fibers consist at least partly of metal or glass or carbon or plastic or natural fibers.

In a preferred refinement, the fibers consist at least partly of steel, in particular special steel.

In an alternative preferred refinement, the fibers consist at least partly of PVA.

Preferred fibers are selected from the group comprising metal fibers, in particular steel fibers or amorphous metal fibers; mineral fibers, in particular glass fibers, basalt fibers or Wollastonite fibers; natural fibers, in particular cellulose fibers, hemp fibers, linen fibers or silk fibers; and plastic fibers, in particular carbon fibers, fibers of polypropylene, polyethylene, polyvinyl alcohol, polyamide, polyaramide, polyacrylonitrile or polyester, and mixtures thereof; wherein metal fibers, carbon fibers, fibers of polypropylene or fibers of polyvinyl alcohols or mixtures thereof are particularly preferred.

In an exemplary embodiment, the building material contains fibers, wherein the fibers are formed so as to be flexible. In particular, depending on the material of the fibers, a height of the fibers is selected such that the fibers are bendable.

In an exemplary embodiment, the building material contains fibers, wherein 1 liter of building material contains between 1,000 and 1,000,000,000 fibers, preferably between 5000 and 500,000,000 fibers, particularly preferably between 10,000 and 100,000,000 fibers.

Depending on the material and size of the fibers, a very different number of fibers per liter building material may be used. For example, several hundred million very small carbon fibers may be used, or just a few thousand much larger steel fibers.

It has been found that such a number of fibers is particularly suitable firstly for effective mechanical reinforcement of a structure produced from the building material, and secondly for preventing a tendency towards clogging of the mixer.

In an exemplary embodiment, the building material does not contain fibers, wherein the conveyor device has two to ten, preferably three to eight, particularly preferably four to six windings.

In tests, it was found that a conveying device with two to ten windings is particularly suitable for conveying building materials without fibers with the desired pressure.

In an exemplary embodiment, the conveying device is made at least partly of plastic. In an advantageous refinement, the conveying device is made at least partly of nylon.

In a further preferred refinement, the conveying device is produced using a 3D printing process.

In an alternative embodiment, the conveying device is made at least partly of metal, for example steel.

In an exemplary embodiment, the conveying device is arranged on the agitator shaft and actively connected thereto, wherein the conveying device is configured to be removable from the agitator shaft.

In an exemplary embodiment, the conveyor device is pressed onto the agitator shaft and secured to the agitator shaft by a locking element.

The object presented initially is furthermore achieved by a method for production of a structure from the building material, wherein the method comprises: provision of a first component of the building material comprising a pumpable concrete which contains an aggregate; provision of a second component of the building material comprising a concrete additive which contains an accelerator; mixing of the first component and the second component in a mixer, wherein the mixer comprises a drive and a mixing chamber with an agitator shaft and a conveyor device, wherein the conveyor device is configured as a screw conveyor with windings; movement of a movement device for changing an application site in a space; conveying of the building material by the conveyor element; application of the building material; and adaptation of the mixer to the building material.

The mixer here is adapted to the respective building material in the same way as already described for the device for applying the building material.

In an exemplary embodiment, the movement device is configured in the manner of a 3D printer so as to be movable, so that the device or method can be used to build widely varying structures from the building material.

Such devices in the manner of 3D printers offer the advantage that in this way, whole structures can be produced from the building material, such as for example building walls or similar. No shuttering is required and therefore the shaping of the structure can be selected substantially more freely than is the case with conventional devices or methods.

In an exemplary embodiment, during mixing the mixer is operated with a rotation speed of over 500 revolutions per minute, preferably with a rotation speed of more than 650 revolutions per minute, particularly preferably with a rotation speed of more than 800 revolutions per minute, particularly preferably with a rotation speed of more than 1000 revolutions per minute.

Operating the mixer with high rotation speeds offers the advantage that in this way, mixing products with high or rapidly rising viscosity (such as for example concrete with accelerator) can be mixed as efficiently and quickly as possible, and then delivered out of the mixer without the mixer becoming blocked and failing in its function.

Also, such high rotation speeds offer the advantage that in this way, not only can a very good mixing of the materials be achieved, but structures in the mixed product can thereby be broken up.

In tests, pumpable concrete was mixed together with accelerator at rotation speeds of between 200 and 2,000 revolutions per minute. It was found that, on mixing with rotation speeds of less than 500 revolutions per minute, the mixture produced was not sufficiently homogenous or smooth, so that the pumpable concrete and pumpable accelerator did not mix together satisfactorily. This led to hardening behavior which was difficult to control, since the insufficiently homogenous mixture had regions with disproportionately high levels of accelerator and regions with correspondingly too little accelerator. This may also lead to blockades in the mixer and/or to defects in the applied mixture, such as for example regions with insufficient strength after a specific time from leaving the mixer. In tests, it was also found that the following effects occur because of the high rotation speeds: firstly, the concrete and accelerator were mixed better, which leads to more controllable hardening behavior. Secondly, the concrete is broken up more, so that the accelerator can act on a larger surface area of the concrete, which leads to faster and more controllable reaction between the concrete and the accelerator. Thirdly, more energy was introduced into the mixture, which leads to a greater heating of the concrete and accelerator, which in turn accelerates the hardening process.

The effects described above were observed to an increasing extent up to rotation speeds of 2000 revolutions per minute.

In an advantageous embodiment, in application of the building material, the building material is applied in several layers which lie at least partially over each other.

In an advantageous refinement, during application, an existing layer is only overlaid with a new layer of the building material when the existing layer has sufficiently high strength to retain its original form.

In an advantageous refinement, during application, at least partially superposed layers of the building material are built up continuously, so that the structure of building material can be built up in the fashion of a 3D print.

Figure 1:
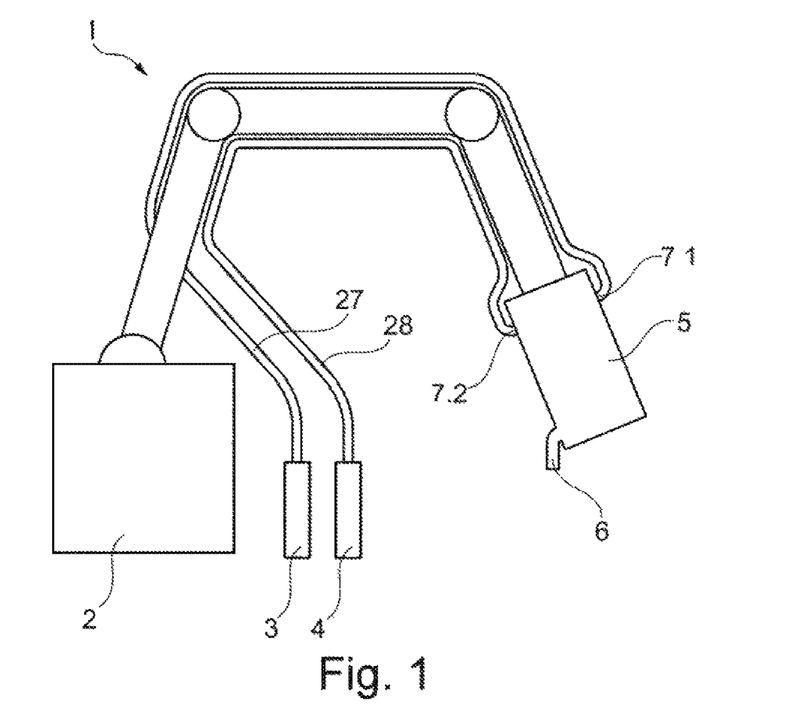
FIG. 1 a diagrammatic depiction of an exemplary device for applying a building material.

FIG. 1 shows diagrammatically a device for applying a building material. The device 1 comprises a movement device 2 which, in this exemplary embodiment, is configured as a device with a crane-like arm. A mixer 5 is arranged at a head of the movement device 2. A first component 3 and a second component 4 can be supplied to the mixer 5 via a respective first hose 27 and second hose 28. The mixer 5 has a first inlet 7.1 and a second inlet 7.2, at which the first component 3 and the second component 4 can be supplied to the mixer 5. The mixer 5 furthermore has an outlet 6, via which the building material can be applied.

In this exemplary embodiment, the mixer 5 is moved by the movement device 2 to a site at which the building material is to be applied.

Figure 2:
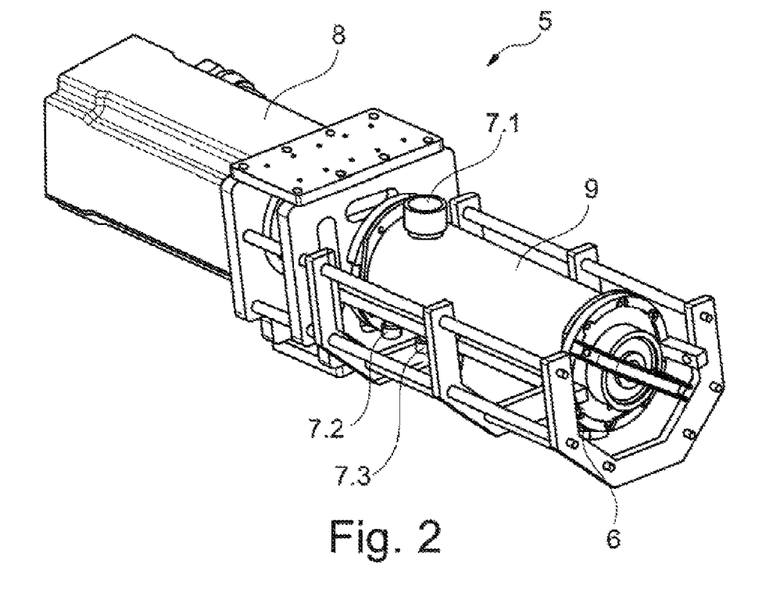
FIG. 2 a diagrammatic depiction of an exemplary mixer.

FIG. 2 shows the mixer 5 from FIG. 1 in more detail. The mixer 5 has a drive 8 and a mixing chamber 9. The mixing chamber 9 has a first inlet 7.1, a second inlet 7.2 and a third inlet 7.3. The mixing chamber 9 also has an outlet 6. Here, for example, the first inlet 7.1 may be used for supply of the first component, the second inlet 7.2 may be used for supply of cleaning fluid to the mixing chamber 9, and the third inlet 7.3 may be used for supply of the second component of the building material to the mixing chamber 9. A nozzle (not shown) may be arranged for example at the outlet 6 in order to apply the building material in a desired cross-section.

Figure 3:
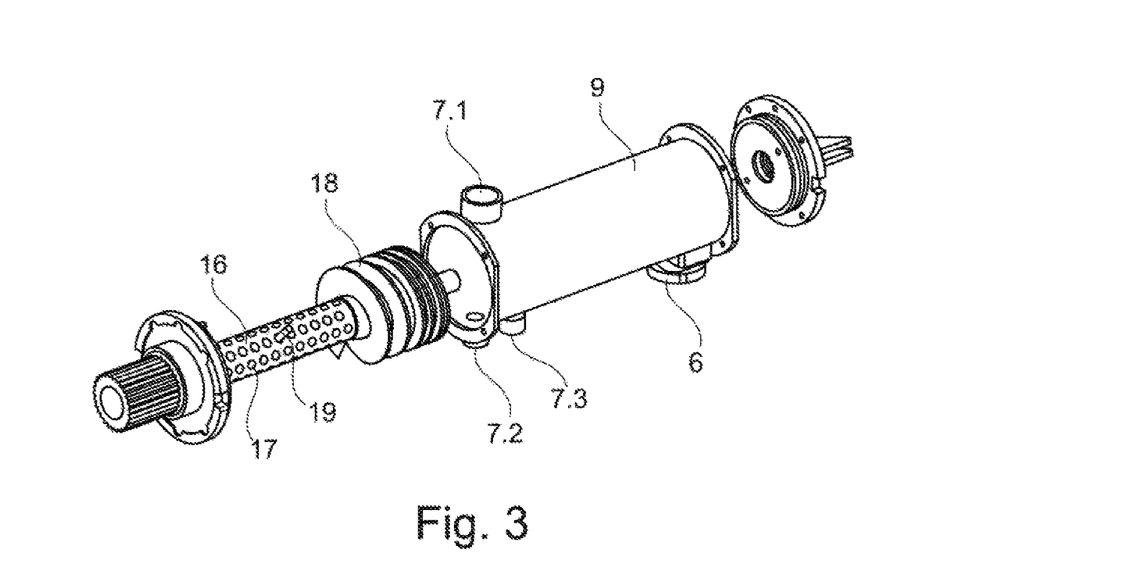
FIG. 3 an exemplary depiction of a mixing chamber.

FIG. 3 shows as an example various components of the mixing chamber 9. It is evident that an agitator shaft 16 is arranged in the mixing chamber 9, and agitator elements 19 and a conveyor element 18 are arranged thereon. In this exemplary embodiment, the agitator elements 19 are arranged on a first portion of the agitator shaft 16, and the conveyor device 18 is arranged on a second portion of the agitator shaft 16. The first portion of the agitator shaft with the agitator elements 19 is arranged in the region of the inlets 7.1, 7.2, 7.3, and the conveyor device 18 is arranged in the region of the outlet 6.

Figure 4:
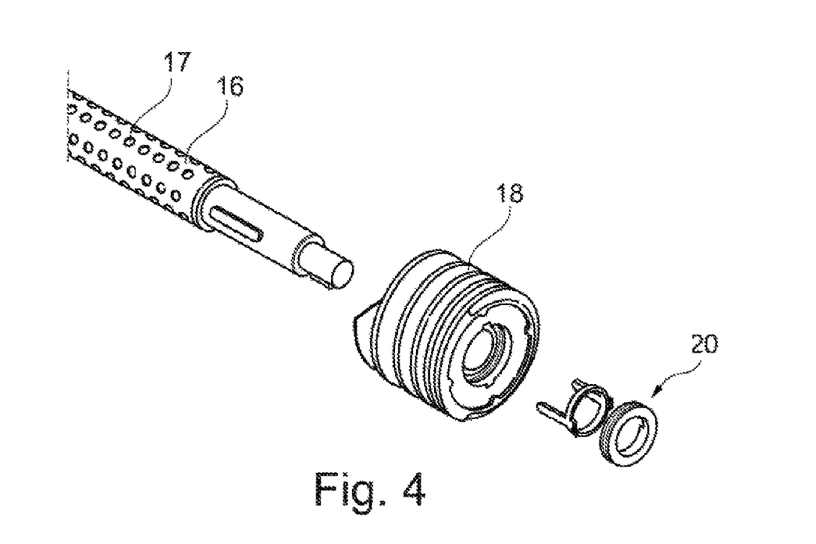
FIG. 4 an exemplary depiction of a conveyor device.

FIG. 4 shows an exemplary conveyor device 18. It is evident that the conveyor device 18 may be designed to be pressed onto the agitator shaft 16. In this exemplary embodiment, a locking element 20 is also provided for securing the conveyor device 18 on the agitator shaft 16.

In the exemplary embodiments shown, the agitator shaft 16 has depressions 17 in which the agitator elements 19 may be attached. This attachment may take place for example by screwing the agitator elements onto the agitator shaft, wherein the agitator elements have an external thread and the depressions have an internal thread. In the exemplary embodiment shown, the agitator elements 19 are configured as pins. It is self-evident that more agitator elements 19 than are shown in the figures may be arranged on the agitator shaft 16.

Figure 5A:
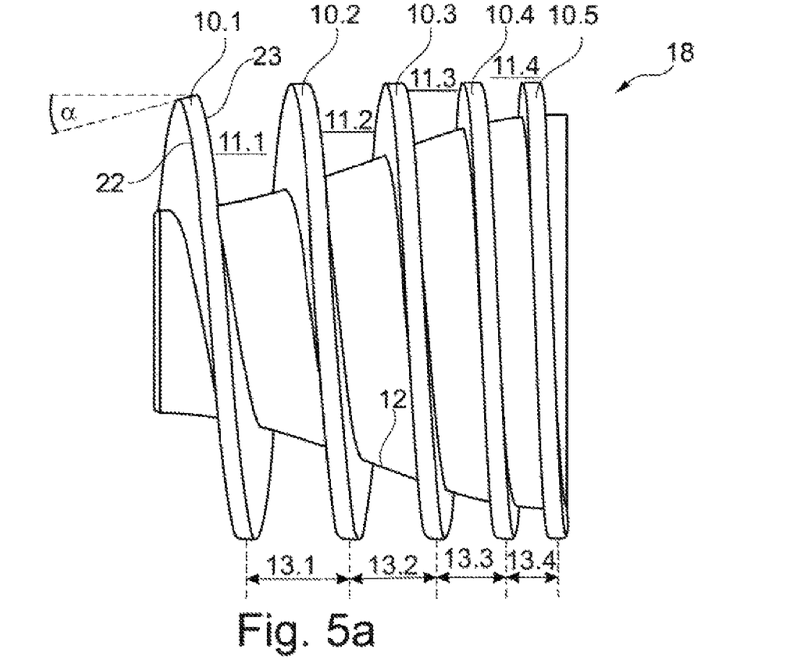
FIGS. 5*a* and 5*b* an exemplary depiction of a conveyor device for building materials without fibers.
Figure 5B:
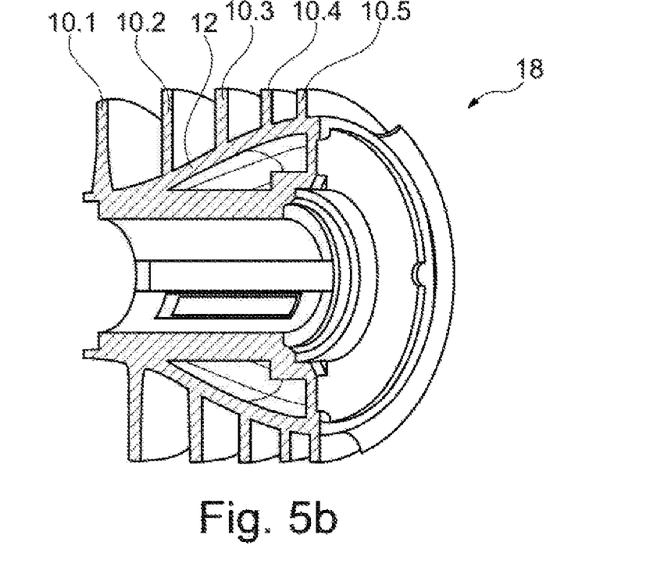

FIGS. 5a and 5b show an exemplary conveyor element 18 which is suitable in particular for building materials without fibers. In this exemplary embodiment, the conveyor device 18 is configured as a screw conveyor. The screw conveyor has several windings 10.1, 10.2, 10.3, 10.4, 10.5. The windings 10.1, 10.2, 10.3, 10.4, 10.5 are separated by a respective conveyor cross-section 11.1, 11.2, 11.3, 11.4. In FIG. 5a, it is evident that the conveyor cross-sections 11.1, 11.2, 11.3, 11.4 become smaller, the closer they are arranged to an outlet of the mixer (not shown). The conveyor cross-sections 11.1, 11.2, 11.3, 11.4 are determined firstly by the form of the delimiting surface 12, and secondly by the size of the distances 13.1, 13.2, 13.3, 13.4 between adjacent windings 10.1, 10.2, 10.3, 10.4, 10.5.

In this exemplary embodiment, the first winding 10.1—which is furthest removed from an outlet of the mixer (not shown)—has a smaller diameter than the following windings 10.2, 10.3, 10.4, 10.5. Also, the first winding 10.1 has an outer surface which is chamfered by an angle α. A first edge 22 is formed lower than the second edge 23, wherein the first edge 22 is spaced further from the outlet of the mixer (not shown) than the second edge 23.

FIG. 5b shows the same conveyor device as FIG. 5a, but in a perspective view and as a sectional drawing. In FIG. 5b, it is also evident that the conveyor device 18 may be pressed onto the agitator shaft 16 and secured (see FIG. 4).

Figure 6A:
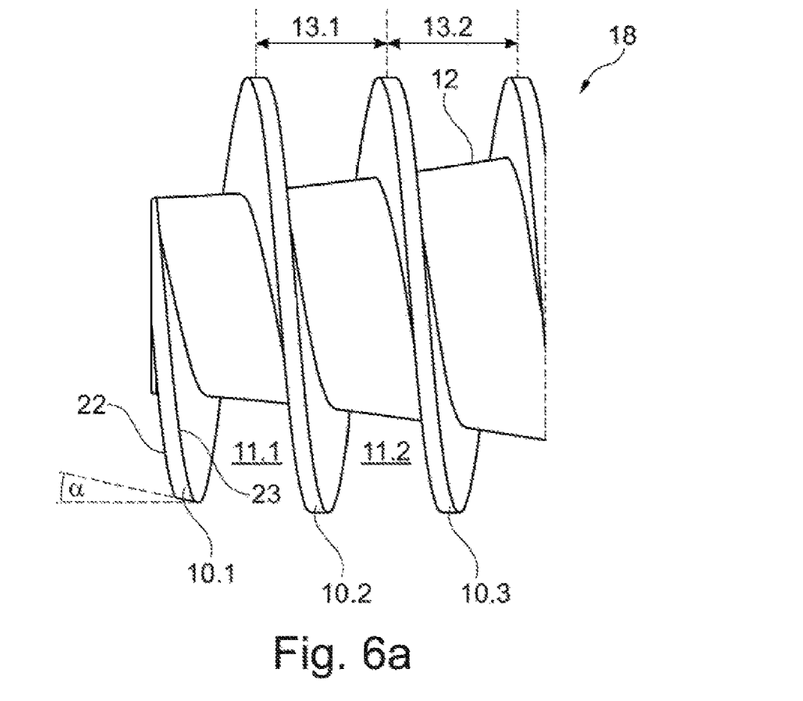
FIGS. 6*a* and 6*b* an exemplary depiction of a conveyor device for building materials with fibers.
Figure 6B:
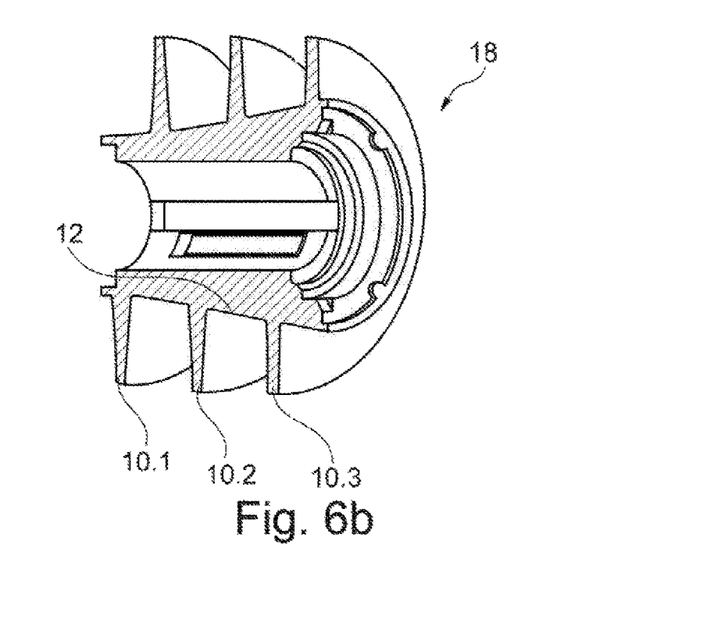

FIGS. 6a and 6b show a further exemplary conveyor device 18 which is particularly suitable for building materials with fibers. In this exemplary embodiment, the first winding 10.1 is again chamfered and is smaller than the further windings 10.2, 10.3. In contrast to the conveyor device in FIGS. 5a and 5b, the distances 13.1, 13.2 between the windings 10.1, 10.2, 10.3 are equal in this exemplary embodiment. In particular, the distances 13.1, 13.2 are selected such that they amount to at least 80% of a length of the fibers of the building material.

In this exemplary embodiment, the conveyor cross-sections 11.1, 11.2 also reduce from winding to winding, but less greatly than in the exemplary embodiment in FIGS. 5a and 5b. In this exemplary embodiment, the delimiting surface 12 of the conveyor device 18 also has a substantially rectilinear cross-section.

FIG. 6b shows the same conveyor device 18 as FIG. 6a, but in perspective view and as a cross-section. Again it is evident that the conveyor device 18 may be pressed onto the agitator shaft and secured (see FIG. 4).

Figure 7:
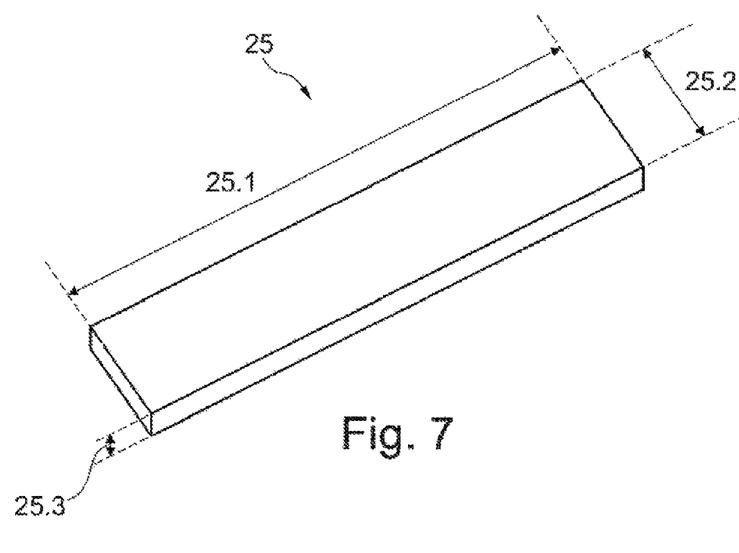
FIG. 7 a diagrammatic depiction of an exemplary fiber.

FIG. 7 shows an exemplary fiber 25. The fiber has a length of 25.1, a width 25.2 and a height 25.3. The height 25.3 of the fiber 25 is in particular selected such that, in accordance with the fiber material, the fiber 25 is configured so as to be flexible.

Figure 8:
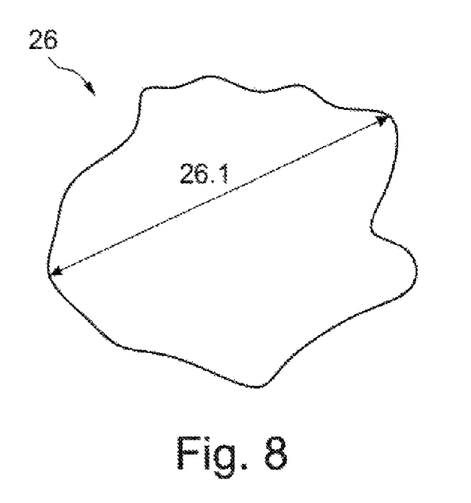
FIG. 8 a diagrammatic depiction of a grain of an aggregate of the building material.

FIG. 8 shows an exemplary grain 26 of the aggregate of the building material. As shown here, the grain 26 may have an irregularly formed surface. A diameter 26.1 corresponds to a largest diameter of the grain 26.

The invention claimed is:

1. A device for applying a building material, the device comprising:
    a movement device configured to change an application site in a space;
    a first component of the building material;
    a second component of the building material; and
    a mixer configured to mix the first component and the second component, the mixer comprising a drive, a mixing chamber provided with an agitator shaft having agitator elements having external threads and a conveyor device, and an outlet, the conveyor device being designed as a screw conveyor with windings,
    wherein:
    (1) the building material contains fibers, and at least one of:
        (i) a distance between adjacent windings of the screw conveyor is at least 40% of a length of the fibers, and
        (ii) a distance between adjacent agitator elements of the agitator shaft is at least 40% of a length of the fibers,
    (2) the building material does not contain fibers, and at least one of:
        (i) distances between adjacent windings of the screw conveyor are smaller, the closer the windings are arranged to the outlet, and
        (ii) a distance between adjacent agitator elements of the agitator shaft is between 5 and 50 mm, or
    (3) the first component contains an aggregate, and a distance between ends of the agitator elements of the agitator shaft and an inner wall of the mixing chamber is at least as large as a diameter of grains of the aggregate, and
    the agitator shaft has depressions with internal threads, such that the agitator elements are configured to be inserted in and removed from the agitator shaft by rotation.

2. The device as claimed in claim 1, wherein a first winding of the screw conveyor furthest away from the outlet of the mixer has a smaller diameter than following windings.

3. The device as claimed in claim 1, wherein a first winding of the conveyor device has an outer face which is chamfered by an angle such that a first edge is lower than a second edge, the first edge being further away from the outlet of the mixer than the second edge.

4. The device as claimed in claim 1, wherein the first component of the building material is a pumpable concrete, and the second component of the building material is a concrete additive which contains an accelerator.

5. The device as claimed in claim 1, wherein the agitator elements of the agitator shaft are configured as pins.

6. The device as claimed in claim 1, wherein the building material contains fibers, and distances between adjacent windings are substantially equal.

7. The device as claimed in claim 1, wherein the building material contains fibers, and the conveyor device has two to four windings.

8. The device as claimed in claim 1, wherein the building material contains fibers, and a cross-section of a delimiting surface of the conveyor device is formed so as to be substantially rectilinear or substantially S-shaped.

9. The device as claimed in claim 1, wherein the building material contains fibers, and the fibers have at least one of a length of 5 to 20 mm, a width of 5 to 2000 µm, and a height of 5 to 100 µm.

10. The device as claimed in claim 1, wherein at least one of the building material contains fibers, the fibers consist at least partly of metal, plastic, glass, or carbon, and the fibers are flexible.

11. The device as claimed in claim 1, wherein the building material contains fibers, and 1 liter of the building material has between 1,000 and 1,000,000,000 fibers.

12. The device as claimed in claim 1, wherein the building material does not contain fibers, and the conveyor device has two to ten windings.

13. A method for production of a structure from a building material, the method comprising:
    providing a first component of the building material;
    providing a second component of the building material;
    mixing the first component and the second component in a mixer, the mixer comprising a drive, a mixing chamber provided with an agitator shaft having agitator elements having external threads and a conveyor device, and an outlet, the conveyor device being configured as a screw conveyor with windings;
    moving a movement device configured to change an application site in a space;
    conveying the building material with the conveyor device;
    applying the building material; and
    adapting the mixer to the building material,
    wherein:
    (1) in the case of a building material with fibers, at least one of:
        (i) a distance between adjacent windings of the screw conveyor is at least 80% of a length of the fibers, and
        (ii) a distance between adjacent agitator elements of the agitator shaft is at least 80% of a length of the fibers,
    (2) in the case of a building material without fibers, at least one of:
        (i) distances between adjacent windings of the screw conveyor are smaller, the closer the windings are arranged to an outlet, and
        (ii) a distance between adjacent agitator elements of the agitator shaft is between 5 and 50 mm, or
    (3) when the first component contains an aggregate, a distance between ends of agitator elements of the agitator shaft and an inner wall of the mixing chamber is at least as large as a diameter of grains of the aggregate, and
    the agitator shaft has depressions with internal threads, such that the agitator elements are configured to be inserted in and removed from the agitator shaft by rotation.

* * * * *